United States Patent [19]
Ono et al.

[11] Patent Number: 4,588,782
[45] Date of Patent: May 13, 1986

[54] DIENE POLYMERS AND PROCESS FOR PRODUCING THE SAME

[75] Inventors: Hisao Ono; Fumio Tsutsumi; Mitsuhiko Sakakibara, all of Yokkaichi; Eitaro Okuya, Mie, all of Japan

[73] Assignee: Japan Synthetic Rubber Co., Ltd., Tokyo, Japan

[21] Appl. No.: 690,589

[22] Filed: Jan. 11, 1985

[30] Foreign Application Priority Data

Feb. 1, 1984 [JP] Japan ................... 59-15019

[51] Int. Cl.$^4$ .......................................... C08F 293/00
[52] U.S. Cl. ................... 525/245; 525/247; 525/250; 525/261; 525/271; 525/314; 526/146
[58] Field of Search ............... 525/245, 247, 250, 271

[56] References Cited

U.S. PATENT DOCUMENTS 3,949,016  4/1976  Agouri et al. ................. 525/271
4,169,115  9/1979  Tung et al. .................... 525/271
4,379,889  4/1983  Ashitaka et al. ............... 525/247
4,429,085  1/1984  Henderson .................... 526/92
4,501,867  2/1985  Ueno et al. .................... 525/247

FOREIGN PATENT DOCUMENTS 42-13614  8/1967  Japan ........................... 525/250
1224977   3/1971  United Kingdom ........... 525/250

Primary Examiner—Wilbert J. Briggs, Sr.
Attorney, Agent, or Firm—Oblon, Fisher, Spivak, McClelland & Maier

[57] ABSTRACT

A diene polymer produced by polymerizing a conjugated diene monomer in a solvent solution of an active lithium-terminated polymer in the presence of a catalyst consisting of (A) a cobalt compound and (B) carbon disulfide and/or phenylisothiocyanic acid. The diene polymer comprises a 1,2-polybutadiene portion having a high percentage of vinyl conformation. The diene polymer has substantially no mercaptan compound.

41 Claims, No Drawings

DIENE POLYMERS AND PROCESS FOR PRODUCING THE SAME

This invention relates to a novel diene polymer having unsaturated side chains in a high proportion and a novel process for producing the same.

It is known that a 1,2-polybutadiene having a high purity and a high crystallinity can be produced by polymerizing 1,3-butadiene in the presence of a catalyst obtained by three components of a cobalt compound, an organoaluminum compound and carbon disulfide or of a cobalt compound, an organoaluminum compound and phenylisothiocyanic acid [Japanese Patent Publication No. 19,892/72 and Japanese patent application Kokai (Laid-open) No. 30,890/76]. 1,2-Polybutadienes produced by polymerization in the presence of such a catalyst have high melting points and high crystallinities, and hence, their application is expected to such fields as plastic product, film, fiber, rubberreinforcing polymer and the like. Particularly, a diene rubber reinforced with said 1,2-polybutadiene has excellent properties; therefore, various processes for producing such a diene rubber have been developed. These processes are disclosed, for example, in Japanese Patent Publication No. 17,666/74 and Japanese patent application Kokai (Laid-Open) Nos. 29,535/80, 31,802/80, 151,054/80 and 187,408/83.

All these processes use carbon disulfide or phenylisothiocyanic acid as a catalyst component. This gives rise to formation of sulfur compounds such as mercaptan and the like in the polymerization step. As a result, (1) the polymer produced has a strong offensive odor, and accordingly, its application range is limited, (2) the offensive odor in the production step is strong, which requires countermeasures from standpoints of environment and waste water disposal; and (3) the sulfur compounds formed such as mercaptan and the like act as a catalyst poison, which requires an appropriate equipment for removal of the compounds in the purification of the recovered solvent.

An object of this invention is to provide a diene polymer having unsaturated side chains in a high proportion which is free from any mercaptan compound as an impurity.

Another object of this invention is to provide a process for producing a diene polymer having unsaturated side chains in a high proportion, wherein no mercaptan compound is formed in the polymerization step, using carbon disulfide or phenylisothiocyanic acid as one component of the polymerization catalyst.

Other objects and advantages of this invention will become apparent from the following description.

According to this invention, there is provided a diene polymer produced by polymerizing a conjugated diene monomer in an organic solvent solution of an active lithium-terminated polymer in the presence of a catalyst consisting of (A) a cobalt compound and (B) carbon disulfide or phenylisothiocyanic acid or a mixture thereof, said diene polymer comprising a 1,2-polybutadiene portion having a 1,2-configuration content of at least 70%.

This invention further provides a process for producing a diene polymer, characterized by polymerizing a conjugated diene monomer in a solvent solution of an active lithium-terminated polymer in the presence of a catalyst consisting of (A) a cobalt compound and (B) carbon disulfide and/or phenylisothiocyanic acid.

The active lithium-terminated polymer used in this invention includes monolithium- or dilithium-terminated aromatic vinyl polymers such as polystyryllithium, poly-α-methylstyryllithium, poly-p-methylstyryllithium and the like; monolithium- or dilithium-terminated conjugated diene polymers such as polybutadienyllithium, polyisoprenyllithium, poly-2,3-dimethylbutadienyllithium, poly-2-phenylbutadienyllithium and the like; monolithium- or dilithium-terminated vinylpyridine polymers such as poly-2-vinylpyridyllithium and the like; and monolithium- or dilithium-terminated (meth)acrylic acid ester polymers such as polymethylmethacryllithium, polymethylacryllithium and the like. It also includes monolithium- of dilithium-terminated block copolymers or random copolymers as obtained by polymerizing at least two different monomers in the presence of a lithium catalyst such as lithium-terminated styrene-butadiene block copolymer and lithium-terminated styrene-butadiene random copolymer. These block copolymers may have chemical structures represented by the formula $(A-B)_n$, $(A-B)_n-A$ and $(A-B)_m-X$ (wherein A is a polymer block of an aromatic vinyl compound; B is a polymer block comprising a major amount of a conjugated diene; $n \geq 1$; $m \geq 1$; and X is the residue of a coupling agent), though this is not critical. The block copolymers represented by the formula $(A-B)_n$ and $(A-B)_n-A$ are particularly preferable. The content of the aromatic vinyl compound in the block copolymer is not critical, though it is preferably 5 to 70% by weight.

The aromatic vinyl compound includes styrene, α-methylstyrene, α-ethylstyrene, p-methylstyrene, p-ethylstyrene, α-phenylstyrene, p-dimethylaminostyrene, p-trimethylsilylstyrene, etc. Of these, styrene is most preferable.

The conjugated diene includes butadiene, isoprene, piperylene, 2,3-dimethylbutadiene, 2-phenylbutadiene, 2-methoxybutadiene, etc. Of these, butadiene and isoprene are most preferable.

The polymerization degree of the active lithium-terminated polymer is not critical. The polymer varies from an oligomer to a high molecular weight polymer.

The active lithium-terminated polymer can be produced by polymerizing a monomer such as an aromatic vinyl compound, a conjugated diene compound, vinylpyridine, a (meth)acrylic acid ester or the like, in a solvent such as an aromatic hydrocarbon (i.e. benzene, toluene, xylene or the like), an aliphatic hydrocarbon (i.e. pentane, n-hexane, heptane, octane or the like), an ether (i.e. tetrahydrofuran diethyl ether, dibutyl ether, di-2-ethylhexyl ether, diphenyl ether or the like), a nitrogen-containing compound (i.e. pyridine, tetraethylethylenediamine or the like) or a mixture thereof, in the presence of a catalyst, namely, an organomonolithium or organodilithium compound such as methyllithium, ethyllithium, propyllithium, isopropyllithium, n-butyllithium, sec-butyllithium, t-butyllithium, n-hexyllithium, octyllithium, 1,4-butanedilithium or the like. The active lithium-terminated polymer thus produced still retains a catalyst activity.

The cobalt compound (A) used in this invention includes, for example, organic acid salts of cobalt such as cobalt octylate, cobalt naphthenate, cobalt benzoate, cobalt oxalate, cobalt malonate, cobalt acetate and the like; cobalt complex of ethyl acetoacetate such as cobalt bisacetylacetonate, cobalt trisacetylacetonate and the like; triarylphosphine complexes of cobalt halides such as triphenylphosphine complex of cobalt bromide, trism-tolylphosphine complex of cobalt bromide, tris-m-xylylphosphine complex of cobalt bromide, triphenylphosphine complex of cobalt chloride, triphenylphosphine complex of cobalt iodide and the like; pyridine complexes of cobalt halides; pyridine derivative complexes of cobalt halides such as picoline complex of cobalt chloride and the like; ethyl alcohol complex of cobalt chloride; etc.

The carbon disulfide and/or phenylisothiocyanic acid (B) is preferably preliminarily freed of the dissolved oxygen by nitrogen bubbling or the like, though this is not critical.

The conjugated diene monomer is butadiene, isoprene, a mixture of the two or the like.

The diene polymer of this invention can be produced by adding, to a solvent solution of an active lithium-terminated polymer, (A) 0.02 to 5 moles, preferably 0.5 to 2 moles, of a cobalt compound, (B) 0.02 to 10 moles, preferably 0.2 to 5 moles, of carbon disulfide and/or phenylisothiocyanic acid, and (C) 2 to 1,000,000 moles, preferably 5 to 500,000 moles, of a conjugated diene monomer, per mole of lithium in said active lithium-terminated polymer and then subjecting the resulting mixture to polymerization.

The method of adding the above components may be a method of adding simultaneously the cobalt compound (A), carbon disulfide and/or phenylisothiocyanic acid (B) and the conjugated diene monomer (C) to the solvent solution of an active lithium-terminated polymer or a method which comprises preliminarily contacting the cobalt compound (A) and part of the conjugated diene monomer (C) with the solvent solution of an active lithium-terminated polymer and the adding carbon disulfide and/or phenylisothiocyanic acid (B) and the remainder of the conjugated diene monomer (C), or a method comprising preliminarily introducing a total amount of the conjugated diene monomer (C) into a reaction system, initiating the polymerization of the monomer (C) with the lithium catalyst, and adding, during the polymerization, the cobalt compound (A) and carbon disulfide and/or phenylisothiocyanic acid (B) to the reaction system to complete the polymerization.

The reaction temperature is −50° to 150° C., preferably 0° to 80° C. It is preferable that carbon disulfide and/or phenylisothiocyanic acid be added after the active lithium-terminated polymer and the cobalt compound (A) have reacted with each other.

It is preferable that when the conjugated diene is polymerized after the active lithium-terminated polymer has been contacted with the cobalt compound (A), a polymerization solvent be added for controlling the polymerization temperature or for controlling the melting point of a diene polymer having side chains having unsaturation in a high proportion. The polymerization solvent includes aliphatic hydrocarbon solvents such as pentane, hexane, heptane, octane, cyclohexane and the like; aromatic hydrocarbon solvents such as toluene, benzene, xylene and the like; halogenated hydrocarbon solvents such as methylene chloride, ethylene dichloride, trichloroethane, chlorobenzene and the like; ester solvents such as ethyl acetate, propyl acetate, butyl acetate, amyl acetate, ethyl octylate, ϵ-caprolactone, γ-valerolactone and the like; alcohol solvents such as methanol, ethanol, isopropanol, n-butanol, sec-butanol, octanol, ethylene glycol and the like; ketone solvents such as acetone, methyl ethyl ketone, acetophenone, acetylacetone and the like; nitrile solvents such as acetonitrile, adiponitrile, benzonitrile and the like; and amide solvents such as ϵ-caprolactam, propiolactam, butyrolactam, valerolactam, N-methylpyrrolidone, N-ethylpyrrolidone, N-methylformamide, N-ethylformamide, N,N-dimethylformamide and the like. For controlling the melting point of a diene polymer formed, polar solvents are preferred, and ester solvents, alcohol solvents, ketone solvents, nitrile solvents and amide solvents are more preferably used. These polar solvents may be used alone or in admixture with another solvent such as a hydrocarbon solvent. The larger the amount of the polar solvent used, the lower the melting point of a diene polymer formed becomes.

It is also possible that the solvent solution of an active lithium-terminated polymer is contacted with the cobalt compound (A) and the resulting mixture is mixed with water to obtain an aqueous suspension, to which carbon disulfide and the conjugated diene monomer are added, and the conjugated diene monomer is then subjected to suspension polymerization.

In the process of this invention, when a diene oligomer, which has a low polymerization degree, is used as the active lithium-terminated polymer, a diene polymer having side chains having unsaturation in a high proportion can be obtained which polymer has properties equivalent to those of polymers produced with hitherto known catalyst systems and is free from odor.

Further, various kinds of polymer compositions each comprising diene polymer having side chains having unsaturation in a high proportion can be produced by changing the type and polymerization degree of the active lithium-terminated polymer.

For example, a polystyrene-high-melting 1,2-polybutadiene block copolymer can be obtained by polymerizing butadiene in the presence of an organic solvent solution of an active lithium-terminated polystyrene.

By polymerizing butadiene in the presence of an organic solvent solution of an active lithium-terminated (co)polymer of a conjugated diene or conjugated dienes such as butadiene, isoprene and the like according to this invention, there can be produced a conjugated diene (co)- polymer-high-melting 1,2-polybutadiene block copolymer.

By polymerizing butadiene in the presence of an organic solvent solution of an active lithium-terminated styrene-conjugated diene random copolymer according to this invention, a styrene-conjugated copolymer-high melting 1,2-polybutadiene block copolymer can be produced.

A styrene-conjugated block copolymer-high melting 1,2-polybutadiene block copolymer can be produced by polymerizing butadiene in the presence of an organic solvent solution of an active lithium-terminated styrene-conjugated diene block copolymer according to this invention.

Specific examples of the polymers produced above include the following polymers, in which each symbol refers to:

S: styrene
B: butadiene
I: isoprene
SBR: styrene-butadiene copolymer
SIR: styrene-isoprene copolymer
BR: polybutadiene
IR: polyisoprenee BIR: butadiene-isoprene copolymer
1,2-BR: high-melting 1,2-polybutadiene
SBS: styrene-butadiene block copolymer [includes $(S-B)_n$ and $(S-B)_n-S$ type polymers]
SIS: styrene-isoprene block copolymer [includes $(S-B)_n$ and $(S-B)_n-S$ type polymers]
Conjugated (co)polymer-high-melting 1,2-polybutadiene block copolymers:
BR-1,2-BR, IR-1,2-BR, BIR-1,2-BR
Styrene-conjugated diene random copolymer-high-melting 1,2-polybutadiene block copolymers:
SBR-1,2-BR, SIR-1,2-BR, 1,2-BR-SBR-1,2-BR, 1,2-BR-SIR-1,2-BR
Styrene-conjugated diene block copolymer-high-melting 1,2-polybutadiene block copolymers:
SBS-1,2-BR, SIS-1,2-BR, 1,2-BR-SBS-1,2-BR, 1,2-BR-SIS-1,2-BR The diene polymers produced according to this invention possess improved mechanical properties and have a high utility in industry. For example, in the case of a styrene-butadiene block copolymer-high crystalline 1,2-polybutadiene block copolymer, the mechanical strengths of the styrene-butadiene block copolymer such as tensile strength, elongation, flex resistance and the like are improved, and the extrudability, abrasion resistance, etc. thereof are excellent.

In this invention, the melting point of the highmelting 1,2-polybutadiene is at least 100° C., preferably at least 120° C., and more preferably at least 150° C. Such a 1,2-polybutadiene imparts a great reinforcing effect to a composition comprising the polybutadiene, whereby the composition has excellent mechanical strengths.

The 1,2-configuration content (1,2-content) in the 1,2-polybutadiene portion formed by polymerizing butadiene with the above-mentioned cobalt catalyst is preferably at least 70%, more preferably at least 80%, and particularly preferably at least 90%.

A syndiotactic 1,2-polybutadiene having a low melting point cannot impart a sufficient reinforcing effect.

The weight ratio of an active lithium-terminated polymer to a high-melting 1,2-polybutadiene in a composition comprising these polymers is not critical, though it is 100/1 to 100/1000, preferably 100/1 to 100/200, more preferably 100/2 to 100/100, most preferably 100/3 to 100/30 for reinforcing effect. When the ratio is lower than 100/1, the reinforcing effect of the 1,2-polybutadiene is not sufficient. When the ratio is higher than 100/200, the workability of the composition becomes poor.

The diene polymer produced according to this invention can be used in such applications as various industrial parts, shoe sole, rubber vibration insulator, resin modifiers, tires, adhesives and the like.

This invention will be explained in more detail below referring to Examples; however, the invention is in no way restricted to these Examples. In the Examples, the 1,2-content was measured by NMR spectrometry; the melting point was measured by a differential scanning calorimetry; and the reduced viscosity was measured at 100° C. by dissolving 0.2 g of a sample in tetrahydronaphthalene at 100° C.

EXAMPLE 1

In a 300-ml pressure bottle preliminarily purged with nitrogen were placed 90 ml of toluene which had been subjected to dehydration treatment and 16.5 ml of styrene, and the pressure bottle was stoppered. Into the bottle was charged 9 ml (1.6 moles/liter) of commercially available n-butyllithium. The resulting mixture was subjected to reaction for 3 hr at 50° C. in a polymerization tank (hereinafter, the reaction mixture is referred to as polystyryllithium solution (a)). About 100% of styrene was polymerized. Styrene/Li=10/1 (molar ratio).

In a separate 30-ml pressure bottle purged with nitrogen was placed a Teflon-coated stirrer. Into the bottle were charged 9.4 ml of toluene which had been subjected to dehydration treatment and 1.92 ml of a 0.25 mole/liter solution of cobalt octylate in toluene, and the pressure bottle was stoppered. Thereafter, 1 ml of butadiene for catalyst preparation was placed therein, and the resulting mixture was cooled to 0° C. While rotating the stirrer vigorously, 7.7 ml of the polystyryllithium solution (a) prepared above was added, and the resulting mixture was subjected to reaction for 15 min. Thus, a cobalt catalyst solution A (Li/Co molar ratio=2.0).

(Polymerization)

In a 300-ml pressure bottle purged with nitrogen was placed 200-ml of methylene chloride, and the pressure bottle was stoppered. Into the pressure bottle were charged 27 g of butadiene and 0.24 mM of carbon disulfide. Further, 10 ml of the cobalt catalyst solution A prepared above (0.24 mM as cobalt) was charged thereinto. The resulting mixture was subjected to polymerization at 20° C. for 1 hr. The resulting polymer slurry was added to methanol containing 0.5% of BHT to coagulate the polymer by a conventional method. The polymer was vacuum-dried at 40° C., whereby 22.9 g of a polymer was obtained. This butadiene polymer portion of this polymer had a 1,2-content of 98% and this polymer had a melting point Tm of 197° C. Its reduced viscosity was 1.6 dl/g. The polymer had almost no odor of sulfur compounds. In analysis by a gas chromatography of the solvent recovered, no mercaptans (e.g. ethyl mercaptan and butyl mercaptan) were detected in the solvent.

EXAMPLE 2

Using the cobalt catalyst solution A used in Example 1, polymerization and post-treatment were conducted in the same manner as in Example 1, except that the polymerization solvent was replaced by 170 ml of methylene chloride and 30 ml of ethyl acetate. The yield of the polymer was 18.3 g. The polybutadiene portion of this polymer had a 1,2-content of 93% and this polymer had a melting point Tm of 172° C. Its reduced viscosity was 1.5 dl/g. The polymer had no odor of sulfur compounds.

EXAMPLE 3

In a 30-ml pressure bottle purged with nitrogen was placed a Teflon-coated stirrer. Into the bottle were charged 13.3 ml of toluene which had been subjected to dehydration treatment and 1.92 ml of a 0.25 mole/liter solution of cobalt octylate in toluene, and then the pressure bottle was stoppered. To the pressure bottle was fed 1 ml of butadiene and the resulting mixture was cooled to 0° C. While rotating the stirrer vigorously, 3.9 ml of the polystyryllithium solution (a) of Example 1 was charged into the pressure bottle and the resulting mixture was subjected to reaction for 15 min. Thus, a cobalt catalyst solution B (Li/Co molar ratio=1.0) was obtained.

(Polymerization)

In a 300-ml pressure bottle purged with nitrogen was placed 200 ml of methylene chloride, and the pressure bottle was stoppered. To the pressure bottle were fed 27 g of butadiene and 0.24 mM of carbon disulfide. Further, 10 ml of the cobalt catalyst solution B (0.24 mM as cobalt) was charged into the bottle. The resulting mixture was subjected to polymerization at 20° C. for 1 hr.

According to a conventional method, the polymer slurry obtained was added to methanol containing 0.5% of BHT to coagulate the polymer. The polymer was then vacuum-dried at 40° C., to obtain 19.5 g of a polymer. The butadiene polymer portion of this polymer had a 1,2-content of 98% and this polymer had a Tm of 197° C. Its reduced viscosity was 1.7 dl/g. The polymer had almost no odor of sulfur compounds. In analysis by a gas chromatography of the solvent recovered, no mercaptans (e.g. ethyl mercaptan and butyl mercaptan) were detected in the solvent.

EXAMPLE 4

In a 300-ml pressure bottle purged with nitrogen were placed 101.5 ml of cyclohexane which had been subjected to dehydration treatment and 5.0 ml of styrene, and the pressure bottle was stoppered. Into the pressure bottle was charged 9 ml of commercially available n-butyllithium (1.6 moles/liter), and the resulting mixture was subjected to reaction for 16 hr in a polymerization tank at 50° C. (The reaction mixture is hereinafter referred to as polystyryllithium solution (b).) About 100% of styrene was polymerized. Styrene/Li molar ratio=3/1.

A stirrer was placed in a separate 30-ml pressure bottle purged with nitrogen. Into the bottle were charged 9.4 ml of cyclohexane which had been subjected to dehydration treatment and 1.92 ml of a 0.25 mole/liter solution of cobalt octylate in cyclohexane, and the pressure bottle was stoppered. Into the pressure bottle was charged 1 ml of butadiene and the resulting mixture was cooled to 0° C. While rotating the stirrer vigorously, 7.7 ml of the polystyryllithium solution (b) was added to the mixture, and the resulting mixture was subjected to reaction for 15 min. Thus, a cobalt catalyst solution C was obtained.

(Polymerization)

In a 300-ml pressure bottle purged with nitrogen was placed 200 ml of methylene chloride, and the pressure bottle was stoppered. Into the pressure bottle were charged 27 g of butadiene and 0.24 mM of carbon disulfide. Further, 10 ml of the cobalt catalyst solution C (0.24 mM as cobalt) was charged thereinto, and the resulting mixture was subjected to polymerization for 1 hr.

According to a conventional method, the polymer slurry obtained was added to methanol containing 0.5% of BHT to coagulate the polymer. The polymer was then vacuum-dried at 40° C. to obtain 20.7 g of a polymer. The butadiene polymer portion of this polymer had a 1,2-content of 98% and this polymer had a Tm of 197° C. Its reduced viscosity was 1.6 dl/g. The polymer gave a very slight odor of sulfur compounds. In analysis by a gas chromatography of the solvent recovered, no mercaptans (e.g. ethyl mercaptan and butyl mercaptan) were detected in the solvent.

EXAMPLE 5

In a 300-ml pressure bottle purged with nitrogen were placed 57 ml of toluene which had been subjected to dehydration treatment and 49.5 ml of styrene, and the pressure bottle was stoppered. Into the pressure bottle was charged 9 ml of commercially available n-butyllithium (1.6 moles/liter), and the resulting mixture was subjected to reaction for 3 hr in a polymerization tank at 50° C. (The resulting reaction mixture is hereinafter referred to as polystyryllithium solution (c).). About 100% of styrene was polymerized. Styrene/Li molar ratio=30/1.

In a 30-ml pressure bottle purged with nitrogen was placed a Teflon-coated stirrer. Into the bottle were further charged 9.4 ml of toluene which had been subjected to dehydration treatment and 1.92 ml of a 0.25 mole/liter solution of cobalt octylate in toluene and the pressure bottle was stoppered. Into the pressure bottle was charged 1 ml of butadiene and the resulting mixture was cooled to 0° C. While rotating the stirrer vigorously, 7.7 ml of the polystyryllithium solution (c) was added to the mixture and the resulting mixture was subjected to reaction for 15 min. Thus, a cobalt catalyst solution D was obtained.

(Polymerization)

In a 300-ml pressure bottle purged with nitrogen was placed 200 ml of methylene chloride, and the pressure bottle was stoppered. Into the pressure bottle were charged 27 g of butadiene and 0.24 mM of carbon disulfide. Further, 10 ml of the cobalt catalyst solution D (0.24 mM as cobalt) was charged thereinto, and the resulting mixture was subjected to polymerization at 20° C. for 1 hr.

According to a conventional method, the polymer slurry obtained was added to methanol containing 0.5% of BHT to coagulate the polymer. The polymer was vacuum-dried at 40° C., to obtain 24.1 g of a polymer. The 1,2-polybutadiene portion of this polymer had a 1,2-content of 98% and this polymer had a Tm of 197° C. Its reduced viscosity was 1.5 dl/g. The polymer had almost no odor of sulfur compounds. In analysis by a gas chromatography of the solvent recovered, no mercaptans (e.g. ethyl mercaptan and butyl mercaptan) were detected in the solvent.

Comparative Example 1

In a 300-ml pressure bottle purged with nitrogen was placed 200 ml of toluene which had been subjected to dehydration treatment, and then the pressure bottle was stoppered. Into the pressure bottle were charged 27 g of butadiene, 3.6 ml of a 0.4 mole/liter solution of triethylaluminum in toluene and 0.96 ml of a 0.25 mole/liter solution of cobalt octylate in toluene in this order. Further, 4.8 ml of a 0.1 mole/liter solution of carbon disulfide in toluene to initiate polymerization. The pressure bottle was placed in a constant temperature bath at 20° C. and the contents in the pressure bottle were subjected to polymerization for 1 hr. The polymer formed was treated in the same manner as in Example 1. The yield of the polymer was 20.1 g. The 1,2-polybutadiene portion of this polymer had a 1,2-content of 98% and this polymer had a Tm of 198° C. The polymer had a strong odor of sulfur compounds. One ppm of ethyl mercaptan was detected in the toluene recovered.

Comparative Example 2

In a 300-ml pressure bottle preliminarily purged with nitrogen was placed 200 ml of toluene which had been subjected to dehydration treatment, and the pressure bottle was stoppered. Then, into the pressure bottle were charged 27 g of butadiene, 0.96 ml of a 0.25 mole/liter solution of cobalt octylate in toluene and 4.8 ml of a 0.1 mole/liter solution of carbon disulfide in toluene in this order. To the resulting mixture was added 1.2 ml of a 0.4 mole/liter solution of n-butyllithium in toluene, to initiate polymerization. The pressure bottle was placed in a constant temperature bath at 20° C. and polymerization was conducted for 1 hr. Subsequently, the resulting polymer was treated in the same manner as in Example 1. The yield of the polymer obtained was 3.4 g. The 1,2-polybutadiene portion of this polymer had a 1,2-content of 98% and this polymer had a Tm of 198° C. The polymer had a very strong odor of sulfur compounds. Three ppm of butyl mercaptan was detected in the solvent recovered.

Example 6

In a 5-liter autoclave purged with sufficiently dried nitrogen were placed 2,000 g of dehydrated cyclohexane, 400 g of butadiene and 3.75 mM of n-butyllithium in this order, and polymerization was conducted at 60° C. After the conversion had reached 100%, to the reaction system were added 50 g of butadiene, 3.75 mM of cobalt octanoate and 3.75 mM of carbon disulfide in this order. The resulting mixture was subjected to polymerization for 2 hr, after which 4 g of 2,6-di-t-butyl-p-cresol was added to the reaction mixture, and the solvent was removed by steam stripping. The residue was vacuum-dried at 50° C. for 24 hr, to obtain 445 g of a rubbery polymer.

The 1,2-content of the total polybutadiene portions in the polymer obtained was 19%, the melting point of the polymer was 175° C., and the reduced viscosity of the polymer was 1.3 dl/g. The polymer had no odor of sulfur compounds. In analysis by a gas chromatography, no mercaptan compounds were detected in the solvent recovered.

EXAMPLE 7

Polymerization was conducted in the same manner as in Example 6, except that the 400 g of butadiene used in Example 6 was replaced by the same amount of sufficiently dehydrated isoprene, to obtain 450 g of a rubbery polymer. The 1,2-content of the total polybutadiene portions in this polymer was 10% (excluding the 3,4-content of isoprene unit). And the polymer had a melting point of 174° C. and a reduced viscosity of 1.1 dl/g. The polymer had no odor of sulfur compounds. No mercaptan compounds were detected in the solvent recovered.

EXAMPLE 8

In a 5-liter autoclave purged with sufficiently dried nitrogen were placed 2,000 g of dehydrated cyclohexane, 20 g of dehydrated tetrahydrofuran, 80 g of dehydrated styrene and 320 g of dehydrated butadiene. To the resulting mixture was added 3.5 mM of n-butyllithium, and polymerization was conducted at 40° C. After the conversion had reached 100%, to the reaction mixture were added 50 g of butadiene, 3.5 mM of cobalt octanoate and 3.5 mM of carbon disulfide in this order. The resulting mixture was subjected to polymerization for 2 hr. Then, 4 g of 2,6-di-t-butyl-p-cresol was added and the solvent was removed by steam stripping. The residue was vacuum-dried at 50° C. for 24 hr, to obtain 450 g of a rubbery polymer.

The 1,2-content of the total polybutadiene portions in the polymer obtained was 65%, and the reduced viscosity of the polymer was 1.2 dl/g. And the polymer had a melting point of 175° C. (based on 1,2-polybutadiene portion). The polymer had no odor of sulfur compounds. No mercaptan compounds were detected in the solvent recovered.

EXAMPLE 9

In a 5-liter autoclave purged with sufficiently dried nitrogen were placed 2,000 g of dehydrated toluene and 200 g of dehydrated styrene. Into the autoclave was charged 3 mM of n-butyllithium, and the resulting mixture was subjected to polymerization at 50° C. After the conversion had reached 100%, 200 g of butadiene, 3 mM of cobalt octanoate and 3 mM of carbon disulfide were charged thereinto in this order. The resulting mixture was subjected to polymerization for 2 hr, and then 4 g of 2,6-di-t-butyl-p-cresol was added. The solvent was removed by steam stripping. The residue was vacuum-dried at 50° C. for 24 hr, to obtain 390 g of a resinous polymer.

The 1,2-content of the total polybutadiene portions in the polymer obtained was 98%, the melting point of the polymer was 170° C. and the reduced viscosity of the polymer was 1.0 dl/g. The polymer had no odor of sulfur compounds. No mercaptan compounds were detected in the solvent recovered.

EXAMPLE 10

Polymerization was conducted in the same manner as in Example 9, except that the amounts of styrene and butadiene were changed to 300 g and 100 g, respectively, to obtain 395 g of a resinous polymer. The 1,2-content of the total polybutadiene portions in the polymer was 98%, the melting point of the polymer was 174° C. and the reduced viscosity of the polymer was 0.9 dl/g. The polymer had no odor of sulfur compounds. No mercaptan compounds were detected in the solvent recovered.

Example 11

In the same manner as in Example 6, butadiene was polymerized using n-butyllithium. After the conversion had reached 100%, 50 g of butadiene, 3.75 mM of cobalt octanoate, 3.75 mM of carbon disulfide and 200 g of ethyl acetate were charged in this order. The resulting mixture was subjected to polymerization for 2 hr. In the same manner as in Example 6, 445 g of a dry rubbery polymer was obtained. The 1,2-content of the total polybutadiene portions in the polymer obtained was 20%. And the polymer had a melting point of 161° C. and a reduced viscosity of 1.2 dl/g. The polymer had no odor of sulfur compounds. No mercaptan compounds were detected in the solvent recovered.

EXAMPLE 12

In the same manner as in Example 9, styrene was polymerized using n-butyllithium. After the conversion had reached 100%, 200 g of butadiene was added. Further, 3 mM of cobalt octanoate, 3 mM of carbon disulfide and 200 g of ethyl acetate were added. Polymerization was conducted for 2 hr. The polymer formed was purified and dried by a conventional method, to obtain 385 g of a resinous polymer. The polybutadiene portions of this polymer had a 1,2-content of 96%. This polymer had a melting point of 150° C. and a reduced viscosity of 0.8 dl/g. The polymer had no odor of sulfur compounds. No mercaptan compounds were detected in the solvent recovered.

EXAMPLE 13

In the same manner as in Example 6, butadiene was polymerized using n-butyllithium. After the conversion had reached 100%, 50 g of butadiene was added. To the reaction mixture were added 3.75 mM of cobalt octanoate and 3.75 mM of phenylisothiocyanic acid. The resulting mixture was subjected to polymerization for 2 hr. The polymer formed was purified and dried by conventional method, to obtain 440 g of a rubbery polymer. The 1,2-content of the total polybutadiene portions in the polymer obtained was 19%. And the polymer had a melting point of 175° C. and a reduced viscosity of 1.4 dl/g. The polymer had no odor of sulfur compounds.

EXAMPLE 14

In a 5-liter autoclave purged with sufficiently dired nitrogen were placed 200 g of dehydrated toluene and 200 g of dehydrated styrene. Thereto was added 3.5 mM of n-butyllithium and polymerization was conducted at 60° C. After the polymerization conversion had reached 100%, 200 g of butadiene was added and further polymerization was conducted. Then, to the reaction mixture were added 50 g of butadiene, 3.5 mM of cobalt octanoate and 3.5 mM of carbon disulfide in this order. The resulting mixture was subjected to polymerization for 2 hr. Subsequently, 4 g of 2,6-di-t-butyl-p-cresol was added and the solvent was removed by steam stripping. The residue was dried at 50° C. for 24 hr, to obtain 440 g of a resinous polymer. The 1,2-content of the total polybutadiene portions in the polymer obtained was 25%. And the polymer had a melting point of 176° C. and a reduced viscosity of 1.3 dl/g. The polymer had no odor of sulfur compounds. No mercaptan compounds were detected in the solvent recovered.

Comparative Example 3

In a 5-liter autoclave purged with sufficiently dried nitrogen, 400 g of a polybutadiene obtained using n-butyllithium (reduced viscosity: 1.5 dl/g, 1,2-content: 10%) was dissolved in 2,000 g of dehydrated cyclohexane. Thereto were added 50 g of dehydrated butadiene, 3.5 mM of cobalt octanoate, 3.5 mM of n-butyllithium and 3.5 mM of carbon disulfide in this order. The resulting mixture was subjected to polymerization at 50° C. for 1 hr. Then, 4 g of 2,6-di-t-butyl-p-cresol was added and the solvent was removed by steam stripping. The residue was vacuum-dried at 50° C. for 24 hr, whereby 445 g of a rubbery polymer was obtained. The 1,2-content of the total polybutadiene portions in the polymer obtained was 19%. And the polymer had a melting point of 194° C. and a reduced viscosity of 1.4 dl/g. The polymer had an inherent odor of sulfur compounds. One ppm of mercaptan compounds such as butyl mercaptan and the like were detected in the solvent recovered.

Comparative Example 4

In a 5-liter autoclave were placed 2,000 g of dehydrated cyclohexane and 400 g of dehydrated butadiene. Thereto was added 3.75 mM of n-butyllithium and polymerization was conducted at 60° C. When the conversion had reached 45%, 3.1 mM of water was added in the form of a saturated toluene solution and the resulting mixture was cooled to 30° C. Thereto was added 4 mM of n-butyllithium, after which 10 mM of diethylaluminum monochloride, 0.15 mM of cobalt octylate and 0.4 mM of carbon disulfide were added thereto. The resulting mixture was subjected to polymerization at 30° C. for 10 min. Then, 4 g of 2,6-di-t-butyl-p-cresol was added and the solvent was removed by steam stripping. The residue was dried at 50° C. for 24 hr, to obtain 202 g of a rubbery polymer. The 1,2-content of the total polybutadiene portions in the polymer obtained was 19%. And the polymer had a melting point of 197° C. and a reduced viscosity of 1.5 dl/g. The polymer had a strong odor of sulfur compounds. Ethyl mercaptan and butyl mercaptan were detected in the solvent recovered.

EXAMPLE 15

(Synthesis of SBS block copolymer)

In a 5-liter autoclave purged with nitrogen were placed 80 g of styrene and 2,800 ml of cyclohexane containing 150 ppm of tetrahydrofuran which had preliminarily been subjected to dehydration and oxygen removal. The mixture was heated to 50° C., and then 15.6 ml of a 0.5 mole/liter solution of n-butyllithium in cyclohexane was added. Polymerization of styrene was initiated. After 1 hr, 240 g of butadiene was added, and the temperature of the contents in the autoclave was raised to 60° C., and polymerization was conducted for 1.5 hr, whereby butadiene was completely polymerized. Subsequently, 80 g of styrene was added and polymerization was conducted for 1 hr, to confirm that the polymerization had proceeded substantially quantitatively. Then, the autoclave was cooled to 20° C.

(1,2-Polymerization of butadiene)

To the polymer solution obtained above was added 200 g of butadiene. Subsequently, 19.5 ml of a 0.20 mole/liter solution of cobalt octylate in cyclohexane was added. The mixture was stirred for 10 min. Thereto was added 19.5 ml of carbon disulfide (0.20 mole/liter), and the resulting mixture was subjected to polymerization at 20° C. for 2 hr. The resulting polymer solution was taken out of the autoclave. To the solution was added 2 g of BHT and, after thorough stirring, steam stripping was conducted to remove the solvent. The residue was vacuum-dried at 50° C. for 3 days, to obtain 508 g of a polymer (67.5% as the yield of a 1,2-BR). In 100 ml of toluene was dissolved 0.5 g of this polymer, to find that 78% of the polymer had been dissolved in toluene and 22% had not. The polymer had a glass transition temperature of −103° C. and a melting point of 166° C. The toluene-soluble portion was subjected to GPC. The chromatogram obtained showed a shoulder on the higher molecular weight side. The toluene soluble portion had a weight average molecular weight of 136,000.

EXAMPLES 16 to 18

An SBS block copolymer was produced in the same manner as in Example 1. The same subsequent procedure as in Example 1 was repeated, except that the amount of butadiene added in the step of 1,2-polymerization of butadiene was changed.

As is obvious from the results of flex test shown in Table 2, the novel block copolymers obtained according to this invention have no wrinkle on the surfaces when flexed and are very excellent in flexibility.

Comparative Example 5

In the same manner as in Example 1, except that 1,2-polymerization of butadiene was not conducted, an SBS block copolymer was produced.

The yield of the copolymer was 99%. The copolymer had a weight average molecular weight of 91,000.

Comparative Example 6

This is a case wherein the styrene-butadienestyrene block copolymer of Comparative Example 5 was mixed with a highly crystalline 1,2-BR.

50 g of a crystalline, syndiotactic 1,2-BR (powder) having a melting point of 195° C. produced by the method of Japanese Patent Publication No. 19,892/72 was mixed with 200 g of the SBS block copolymer of Comparative Example 5 for about 10 min by means of a heated roll at 150° C., to obtain a composition.

[Evaluation of physical properties of polymer]

Each of the samples of Examples 15 to 18 and Comparative Examples 5 and 6 was placed in a mold, heated to 160° C. and allowed to stand for 8 min. Then, it was placed in a cooling press and cooled while applying a pressure of 100 kg/cm$^2$, whereby sheets for evaluation were prepared. These sheets were evaluated for physical properties according to the predetermined test methods. Tensile test was conducted in accordance with JIS K 6301.

TABLE 1

|  | Example | | | | Comp. Example |
|---|---|---|---|---|---|
|  | 15 | 16 | 17 | 18 | 5 |
| Amount of butadiene used in 1,2-polymerization of butadiene (g) | 200 | 160 | 80 | 40 | 0 |
| Yield of polymer (g) | 516 | 508 | 437 | 424 | 397 |
| Yield of 1,2-BR portions (%) | 58 | 68 | 46 | 60 | 0 |
| Tg of polymer (°C.) | −103 | −104 | −105 | −105 | −105 |
| Tm of polymer (°C.) | 166 | 168 | 169 | 165 | — |
| Toluene-soluble portion of polymer* (%) | 78 | 86 | 90 | 93 | 100 |
| Toluene-insoluble portion of polymer** (%) | 22 | 14 | 10 | 7 | 0 |
| Weight average molecular weight of toluene-soluble portion of polymer ($\times 10^{-4}$) | 13.6 | 14.5 | 13.8 | 13.8 | 10.7 |
| 1,2-Content of total polybutadiene portions of toluene-soluble portion of polymer (%) | 18.0 | 16.0 | 14.5 | 14.2 | 13.8 |

*Polymer comprising as major components an SBS block copolymer-high crystalline 1,2-BR and an SBS block copolymer.
**Polymer comprising as a major component a high crystalline 1,2-polybutadiene homopolymer.

TABLE 2

|  | Example | | | | Comparative Example | |
|---|---|---|---|---|---|---|
|  | 15 | 16 | 17 | 18 | 5 | 6 |
| Tensile test result | | | | | | |
| 100% modulus (kg/cm$^2$) | 37 | 36 | 35 | 33 | 37 | 45 |
| 300% modulus (kg/cm$^2$) | 59 | 56 | 53 | 49 | 53 | 69 |
| Tensile strength (kg/cm$^2$) | 200 | 200 | 230 | 215 | 205 | 135 |
| Elongation (%) | 620 | 620 | 670 | 670 | 670 | 420 |
| Flex test result | | | | | | |
| Crack length when flexed 1,000 times (mm) | 2.2 | 2.2 | 2.3 | 2.3 | 2.2 | 2.4 |
| Appearance of sheet | Smooth | Smooth | Smooth | Smooth | Many wrinkles on the surface | Smooth |
| Crack length when flexed 100,000 times (mm) | 3.5 | 2.8 | 3.3 | 3.5 | Broken | Broken |
| Appearance of sheet | Smooth | Smooth | Smooth | Smooth | Fine cacks on the surface | |
| Crack length when flexed 500,000 times (mm) | 8.1 | 6.1 | 5.6 | 5.2 | — | — |
| Appearance of sheet | Smooth | Smooth | Smooth | Smooth | | |
| Akron abroder test Abrasion index* | 100 | 105 | 98 | 107 | 57 | 64 |

*Abrasion index = $\dfrac{\text{Abrasion volume of the Example 15 sample (cc)}}{\text{Abrasion volume of sample of other Example or Comparative Example (cc)}} \times 100$

EXAMPLE 19

(Synthesis of SIS block copolymer)

In a 5-liter autoclave purged with nitrogen were placed 30 g of styrene and 2,800 ml of cyclohexane containing 150 ppm of tetrahydrofuran which had preliminarily been subjected to dehydration and oxygen removal. They were heated to 50° C. Thereto was added 15.6 ml of a 0.5 mole/liter solution of n-butyllithium in cyclohexane and polymerization of styrene was initiated. After 1 hr, 340 g of isoprene was added. The temperature of the autoclave contents was increased to 60° C. and polymerization was conducted for 3 hr. Then, 30 g of styrene was added and polymerization was further conducted for 1 hr, to confirm that the polymerization had proceeded substantially quantitatively. Then, the autoclave was cooled to 20° C.

(1,2-Polymerization of butadiene)

To the polymer solution obtained above was added 160 g of butadiene. Further, 19.5 ml of a 0.20 mole/liter solution of cobalt octylate in cyclohexane was added thereto. They were stirred for 10 min and then 19.5 ml of a 0.20 mole/liter solution of carbon disulfide in cyclohexane was added thereto. Subsequently, polymerization was conducted at 20° C. for 2 hr. The polymer solution was taken out of the autoclave. To the solution was added 2 g of BHT and, after thorough stirring, the solution was subjected to steam stripping to remove the solvent. The residue was vacuum-dried at 50° C. for 3 days, whereby 471 g of a polymer was obtained (45% as the yield of a 1,2-BR). In the same manner as in Example 15, the toluene-soluble portion of the polymer was measured to find that it was 82.0%. The toluene-insoluble portion was 18.0%. The glass transition temperature Tg of the polymer was −72° C. and its melting point Tm was observed at 149° C. and at 159° C. The toluene soluble portion had a number average molecular weight Mn of 97,000 and a weight average molecular weight Mw of 120,000. Mw/Mn=1.24

(Fractionation of polymer)

In a 100-ml of toluene was dissolved 5 g of the polymer produced above. The resulting solution was subjected to high speed centrifugation at 10,000 rpm to separate it into a toluene-soluble portion (A) and a toluene-insoluble portion (I). The toluene-insoluble portion was 20.2% of the original polymer. Methanol was added in small portions to the toluene-soluble portion to precipitate part of the polymer of the toluene-soluble portion and thus Sample B was obtained. Then, a large amount of methanol was added to the residue to obtain Sample C. Thus, the toluene-soluble portion of the original polymer was subjected to fractional precipitation to obtain Samples B and C. Incidentally, the styrene-butadiene-styrene block copolymer produced in the first step of polymerization was named "Sample S".

(Results of measurement of molecular weight, etc.)

Samples B, C and S were subjected to GPC measurement at 30° C.

Sample I was subjected to GPC measurement in o-dichlorobenzene at 120° C.

TABLE 3

| Sample | Result of GPC measurement | | | Microstructure of butadiene portion in polymer and amount of bound styrene in polymer | | | |
|---|---|---|---|---|---|---|---|
| | Mn ($\times 10^{-4}$) | Mw ($\times 10^{-4}$) | Mw/Mn | Trans 1,4 (%) | Vinyl (%) | Cis 1,4 (%) | Amount of bound styrene (%) |
| B | 5.2 | 6.4 | 1.23 | 38.9 | 30.1 | 31.0 | 34.6 |
| C | 3.7 | 4.3 | 1.16 | 49.3 | 13.6 | 37.1 | 39.1 |
| I | 0.33 | 0.78 | 2.36 | — | — | — | — |
| S | 3.7 | 4.1 | 1.10 | 49.5 | 14.0 | 36.5 | 40.0 |

[1]o-dichlorobenzene at 120° C.

EXAMPLE 20

(Production of polymer)

In a 800-ml autoclave preliminarily purged with nitrogen were placed 350 ml of cyclohexane which had been subjected to dehydration and oxygen removal and 0.57 ml of a 0.50 mole/liter solution of tetrahydrofuran. Thereto were added 10 g of styrene and 5.85 ml of a 0.50 mole/liter solution of n-butyllithium (5.85 ml corresponds to 2.93 mM of n-butyllithium). The resulting mixture was subjected to polymerization at 50° C. for 1 hr. 30 g of butadiene was added and polymerization was conducted at 60° C. for 2 hr. 10 g of styrene was added and polymerization was conducted for 1 hr, whereby a styrene-butadiene-styrene block copolymer (SBS) was formed. The polymerization conversion was almost 100%. Without terminating the polymerization, the whole mixture was cooled to 20° C. Then, thereto were added 20 g of butadiene and 7.3 ml of a 0.2 mole/liter solution of cobalt octylate in cyclohexane (7.3 ml corresponds to 1.46 mM of cobalt octylate). Further, 2.92 ml of a 0.5 mole/liter solution of carbon disulfide in cyclohexane (2.92 ml corresponds to 1.46 mM of carbon disulfide) was added. Polymerization was conducted at 20° C. for 2 hr. Then, by adding 10 ml of methanol, the polymerization was terminated. The polymer formed was coagulated in methanol containing 0.1% of BHT and then vacuum-dried at 50° C. overnight, whereby 64.4 g of a polymer was obtained. The polymerization conversion in the second step of 1,2-polymerization of butadiene corresponds to 72%.

With respect to Samples B, C and S, the microstructure of the butadiene portion and the amount of bound styrene were measured after each sample had been dissolved in carbon disulfide.

With respect to Sample I, the measurements of the above two items were impossible because the sample was insoluble in carbon disulfide.

In view of the microstructure of the butadiene portion and the molecular weight obtained from the GPC measurement, Sample C is identical with Sample S (SBS block copolymer).

In contrast, Sample B, as compared with Sample S, has a larger molecular weight, a much higher vinyl content and a lower amount of bound styrene. This indicates that Sample B is a copolymer in which an SBS block copolymer is copolymerized with a 1,2-polybutadiene and such a copolymer is contained in the polymer of this invention.

EXAMPLE 21

Preparation of catalyst)

(1) Preparation of polybutadienyl-lithium

In a 500-ml pressure bottle preliminarily purged with nitrogen were placed 300 ml of cyclohexane, 30 g of butadiene, 55.5 ml of a 0.5 mole/liter solution of n-butyllithium in cyclohexane (55.5 ml corresponds to 28 mM of n-butyllithium) and 1.5 ml of a 0.5 mole/liter solution of tetrahydrofuran in cyclohexane (1.5 ml corresponds to 0.75 mM of tetrahydrofuran). Polymerization was conducted at 60° C. for 3 hr. It was confirmed that after 3 hr, the polymerization had proceeded almost 100%. Thus, a polybutadienyl-lithium solution was obtained.

(2) Preparation of reacted cobalt

In a 300-ml pressure bottle provided with a stirrer which had preliminarily been purged with nitrogen were placed 5 ml of butadiene and 10 ml of a 0.2 mole/liter solution of cobalt octylate in cyclohexane, and the pressure bottle was stoppered. The pressure bottle was then placed in a cold water at 0° C. for cooling. While rotating the stirrer vigorously, 58.1 ml of the polybutadienyl-lithium solution prepared above (58.1 ml corresponds to 4 mM of lithium) was added and the resulting mixture was stirred for 1 hr.

(Suspension polymerization in aqueous system)

In an 800-ml autoclave preliminarily purged with nitrogen were placed 200 ml of distilled water which had been subjected to nitrogen bubbling, 0.4 g of the sodium salt of maleic anhydride-diisobutylene copolymer and 0.2 g of potassium chloride. The mixture was cooled to 5° C. Thereto were added 50 g of butadiene and 18.3 ml of the reacted cobalt solution prepared above (18.3 ml corresponds to 0.5 mM of cobalt), and the resulting mixture was stirred for about 10 min at 500 rpm. Upon addition of 0.3 mM of carbon disulfide, polymerization started and was continued for 30 min at 15° C. The polymer formed was collected on a cloth, immersed in 0.5% solution of BHT in methanol and then vacuum-dried at 60° C. overnight, to obtain 31.3 g of a bead polymer having an average particle diameter of 0.7 mm. The polymer had a melting point of 187° C. In infrared absorption analysis, the polymer showed a strong absorption due to 1,2-polybutadiene at 911 $cm^{-1}$.

What is claimed is:

1. A diene polymer produced by polymerizing a conjugated diene monomer in an organic solvent solution of an active lithium-terminated polymer in the presence of a catalyst consisting of (A) a cobalt compound and (B) carbon disulfide or phenylisothiocyanic acid or a mixture thereof, said diene polymer comprising a 1,2-polybutadiene portion having a 1,2-configuration content of 70% or more.

2. A diene polymer according to claim 1, wherein the active lithium-terminated polymer is a polymer as produced by polymerizing a monomer or monomers with a lithium catalyst.

3. A diene polymer according to claim 2, wherein the polymer as produced by polymerizing a monomer or monomers with a lithium catalyst is a polymer or copolymer of an aromatic vinyl compound, a copolymer of an aromatic vinyl compound and a conjugated diene compound or a polymer or copolymer of a conjugated diene compound.

4. A diene polymer according to claim 2, wherein the polymer as produced by polymerizing a monomer or monomers with a lithium catalyst is a polymer or copolymer of a conjugated diene compound.

5. A diene polymer according to claim 2, wherein the polymer as produced by polymerizing a monomer or monomers with a lithium catalyst is a copolymer of an aromatic vinyl compound and a conjugated diene compound.

6. A diene polymer according to claim 5, wherein the copolymer of an aromatic vinyl compound and a conjugated diene compound is a block copolymer.

7. A diene polymer according to claim 6, wherein the block copolymer is at least one block copolymer selected from the group consisting of block copolymers represented by the formulas $(A-B)_n$, $(A-B)_n-A$ and $(A-B)_m-X$ [wherein A is a polymer block of an aromatic vinyl compound; B is a polymer block comprising as the major component a conjugated diene; $n \geq 1$; $m \geq 1$; and X is the residue of a coupling agent].

8. A diene polymer according to claim 1, wherein the 1,2-polybutadiene has a melting point of 100° C. or more.

9. A diene polymer according to claim 8, wherein the melting point of the 1,2-polybutadiene is 120° C. or more.

10. A diene polymer according to claim 9, wherein the melting point of the 1,2-polybutadiene is 150° C. or more.

11. A diene polymer according to claim 1, wherein the weight ratio of the active lithium-terminated polymer to the 1,2-polybutadiene is 100/1–100/1,000.

12. A diene polymer according to claim 11, wherein the weight ratio of the active lithium-terminated polymer to the 1,2-polybutadiene is 100/1–100/200.

13. A diene polymer according to claim 12, wherein the weight ratio of the active lithium-terminated polymer to the 1,2-polybutadiene is 100/1–100/100.

14. A diene polymer according to claim 1, wherein the 1,2-content in the 1,2-polybutadiene is at least 80%.

15. A diene polymer according to claim 14, wherein the 1,2-content in the 1,2-polybutadiene is at least 90%.

16. A diene polymer according to claim 1, wherein the organic solvent is at least one solvent selected from the group consisting of aromatic hydrocarbons, aliphatic hydrocarbons, ethers and nitrogen-containing compounds.

17. A diene polymer according to claim 1, wherein the cobalt compound (A) is at least one compound selected from the group consisting of organic acid salts of cobalt, acetonate complex of cobalt, triarylphosphine complexes of cobalt halides, pyridine complexes of cobalt halides, pyridine derivative complexes of cobalt halides and alcohol complexes of cobalt halides.

18. A diene polymer according to claim 1, wherein the conjugated diene monomer is at least one monomer selected from the group consisting of butadiene and isoprene.

19. A diene polymer according to claim 1, wherein the cobalt compound (A) is used in a proportion of 0.02 to 5 moles per mole of lithium in the active lithium-terminated polymer, and the carbon disulfide and/or phenylisothiocyanic acid (B) is used in a proportion of 0.02 to 10 moles per mole of lithium in the active lithium-terminated polymer.

20. A process for producing a diene type polymer, which comprises polymerizing a conjugated diene monomer in an organic solvent solution of an active lithium-terminated polymer in the presence of a catalyst consisting of (A) a cobalt compound and (B) carbon disulfide or phenylisothiocyanic acid or a mixture thereof.

21. A process according to claim 20, wherein the active lithium-terminated polymer is a polymer or copolymer of a conjugated diene compound.

22. A process according to claim 20, wherein the active lithium-terminated polymer is a copolymer of an aromatic vinyl compound and a conjugated diene compound.

23. A process according to claim 22, wherein the copolymer of an aromatic vinyl compound and a conjugated diene compound is a block copolymer.

24. A process according to claim 23, wherein the block copolymer is at least one block copolymer selected from the group consisting of block copolymers represented by the formulas $(A-B)_n$, $(A-B)_n-A$ and $(A-B)_m-X$ [wherein A is a polymer block of an aromatic vinyl compound; B is a polymer block comprising as the major component a conjugated diene; $n \geq 1$; $m \geq 1$; and X is the residue of a coupling agent].

25. A process according to claim 20, wherein the active lithium-terminated polymer is a polymer as produced by polymerizing a monomer or monomers with a lithium catalyst.

26. A process according to claim 25, wherein the lithium catalyst is at least one member selected from the group consisting of organomonolithium compounds and organodilithium compounds.

27. A process according to claim 20, wherein the organic solvent is at least one solvent selected from the group consisting of aromatic hydrocarbons, aliphatic hydrocarbons, ethers and nitrogen-containing compounds.

28. A process according to claim 26, wherein the monomer is at least one monomer selected from the group consisting of aromatic vinyl compounds, conjugated diene compounds, vinylpyridine and (meth)acrylic acid esters.

29. A process according to claim 20, wherein the cobalt compound (A) is at least one compound selected from the group consisting of organic acid salts of cobalt, acetonate complex of cobalt, triarylphosphine complexes of cobalt halides, pyridine complexes of cobalt halides, pyridine derivative complexes of cobalt halides and alcohol complexes of cobalt halides.

30. A process according to claim 20, wherein the conjugated diene monomer is at least one monomer selected from the group consisting of butadiene and isoprene.

31. A process according to claim 20, wherein the cobalt compound (A) is used in a proportion of 0.02 to 5 moles per mole of lithium in the active lithium-terminated polymer, and the carbon disulfide and/or phenylisothiocyanic acid (B) is used in a proportion of 0.02 to 10 moles per mole of lithium in the active lithium-terminated polymer.

32. A process according to claim 31, wherein the cobalt compound (A) is used in a proportion of 0.5 to 2 moles per mole of lithium in the active lithium-terminated polymer, and carbon disulfide and/or phenylisothiocyanic acid (B) is used in a proportion of 0.2 to 5 moles per mole of lithium in the active lithium-terminated polymer.

33. A process according to claim 20, wherein the organic solvent solution of an active lithium-terminated polymer is reacted with the cobalt compound (A) and the conjugated diene monomer (C), and then the carbon disulfide and/or phenylisothiocyanic acid (B) is added.

34. A process according to claim 20, wherein the temperature for polymerization of the conjugated diene monomer (C) is $-50°$ to $150°$ C.

35. A process according to claim 34, wherein the temperature for polymerization of the conjugated diene monomer (C) is $0°$ to $80°$ C.

36. A process according to claim 20, wherein at least one polymerization solvent selected from the group consisting of aliphatic hydrocarbons, aromatic hydrocarbons, halogenated hydrocarbons, esters, alcohols, ketones, nitriles and amides is used in the polymerization.

37. A process according to claim 36, wherein the polymerization solvent used is at least one member selected from the group consisting of aliphatic hydrocarbons, aromatic hydrocarbons and halogenated hydrocarbons or is a solvent comprising said at least one member as the major component.

38. A process according to claim 20, wherein the organic solvent solution of an active lithium-terminated polymer is contacted with the cobalt compound (A) in the presence of part of the conjugated diene monomer (C); then the resulting mixture is mixed with water to form an aqueous dispersion; thereto are added the carbon disulfide and/or phenylisothiocyanic acid (B) and the conjugated diene monomer (C); and then emulsion or suspension polymerization is conducted.

39. A process according to claim 20, wherein a cobalt compound, carbon disulfide and/or phenylisothiocyanic acid and a conjugated diene monomer are simultaneously added to said organic solvent solution of said active lithium-terminated polymer, and then said conjugated diene monomer is polymerized.

40. A process according to claim 20, wherein, in a first step, said cobalt compound and a portion of the conjugated diene monomer to be polymerized are initially mixed with an organic solvent solution of said active lithium-terminated polymer, and in a second step, carbon disulfide and/or phenylisothiocyanic acid and the remainder of the conjugated diene to be polymerized are added to the organic solvent solution, and subsequently the conjugated diene monomer is polymerized.

41. A process according to claim 20, wherein the total amount of said conjugated diene monomer to be polymerized is fed to a reaction system containing said lithium compound catalyst, and then the polymerization of the conjugated diene monomer is initiated, after which initiation the cobalt compound, carbon disulfide and/or phenylisothiocyanic acid are added to the reaction system to complete the polymerization process.

* * * * *